United States Patent
Srikantam et al.

(10) Patent No.: US 7,339,853 B2
(45) Date of Patent: Mar. 4, 2008

(54) TIME STAMPING EVENTS FOR FRACTIONS OF A CLOCK CYCLE

(75) Inventors: Vamsi Krishna Srikantam, Fremont, CA (US); Andew David Fernandez, Palo Alto, CA (US); Dietrich Werner Vook, Los Altos, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 63 days.

(21) Appl. No.: 11/292,472

(22) Filed: Dec. 2, 2005

(65) Prior Publication Data

US 2007/0127318 A1 Jun. 7, 2007

(51) Int. Cl.
*G04F 8/00* (2006.01)

(52) U.S. Cl. .................. 368/113; 368/120; 375/354; 702/79; 702/187

(58) Field of Classification Search .............. 368/113, 368/130; 375/354; 702/79, 187
See application file for complete search history.

(56) References Cited

U.S. PATENT DOCUMENTS

| | | | | | |
|---|---|---|---|---|---|
| 5,517,250 | A | * | 5/1996 | Hoogenboom et al. | 375/240.27 |
| 5,742,623 | A | * | 4/1998 | Nuber et al. | 714/798 |
| 6,144,336 | A | * | 11/2000 | Preston et al. | 342/357.09 |
| 6,823,075 | B2 | * | 11/2004 | Perry | 382/100 |
| 6,917,281 | B1 | * | 7/2005 | Goldberg | 340/7.53 |
| 6,950,375 | B2 | * | 9/2005 | Duffner et al. | 368/113 |
| 7,058,963 | B2 | * | 6/2006 | Kendall et al. | 725/21 |
| 7,086,075 | B2 | * | 8/2006 | Swix et al. | 725/10 |
| 7,180,407 | B1 | * | 2/2007 | Guo et al. | 340/436 |
| 2002/0012445 | A1 | * | 1/2002 | Perry | 382/100 |
| 2003/0115587 | A1 | * | 6/2003 | Kendall et al. | 725/9 |
| 2003/0217361 | A1 | * | 11/2003 | LoMonaco et al. | 725/63 |
| 2004/0163103 | A1 | * | 8/2004 | Swix et al. | 725/13 |
| 2004/0218599 | A1 | * | 11/2004 | Kobayashi | 370/389 |
| 2004/0230797 | A1 | * | 11/2004 | Ofek et al. | 713/168 |
| 2005/0152681 | A1 | * | 7/2005 | Jung et al. | 386/95 |
| 2005/0180384 | A1 | * | 8/2005 | Jeong et al. | 370/350 |
| 2006/0026314 | A1 | * | 2/2006 | Franchuk et al. | 710/58 |
| 2006/0136981 | A1 | * | 6/2006 | Loukianov | 725/135 |
| 2006/0165811 | A1 | * | 7/2006 | Black et al. | 424/570 |

* cited by examiner

*Primary Examiner*—Gary F. Paumen

(57) ABSTRACT

Generally, the embodiments are directed to circuits and methods for time stamping an event at a fraction of a clock cycle. A time stamping circuit comprises two or more detection circuits. The detection circuits receive an event-in signal and generate event signals based on a clock phase at which the event-in signal was received. A decoder receives the event signals and outputs an event-out signal and a time stamp that represents the phase at which the event-in signal was detected. By time stamping the event-in signal to a phase division, the time stamping circuit detects event signals that occur at a rate faster than the clock cycle.

25 Claims, 8 Drawing Sheets

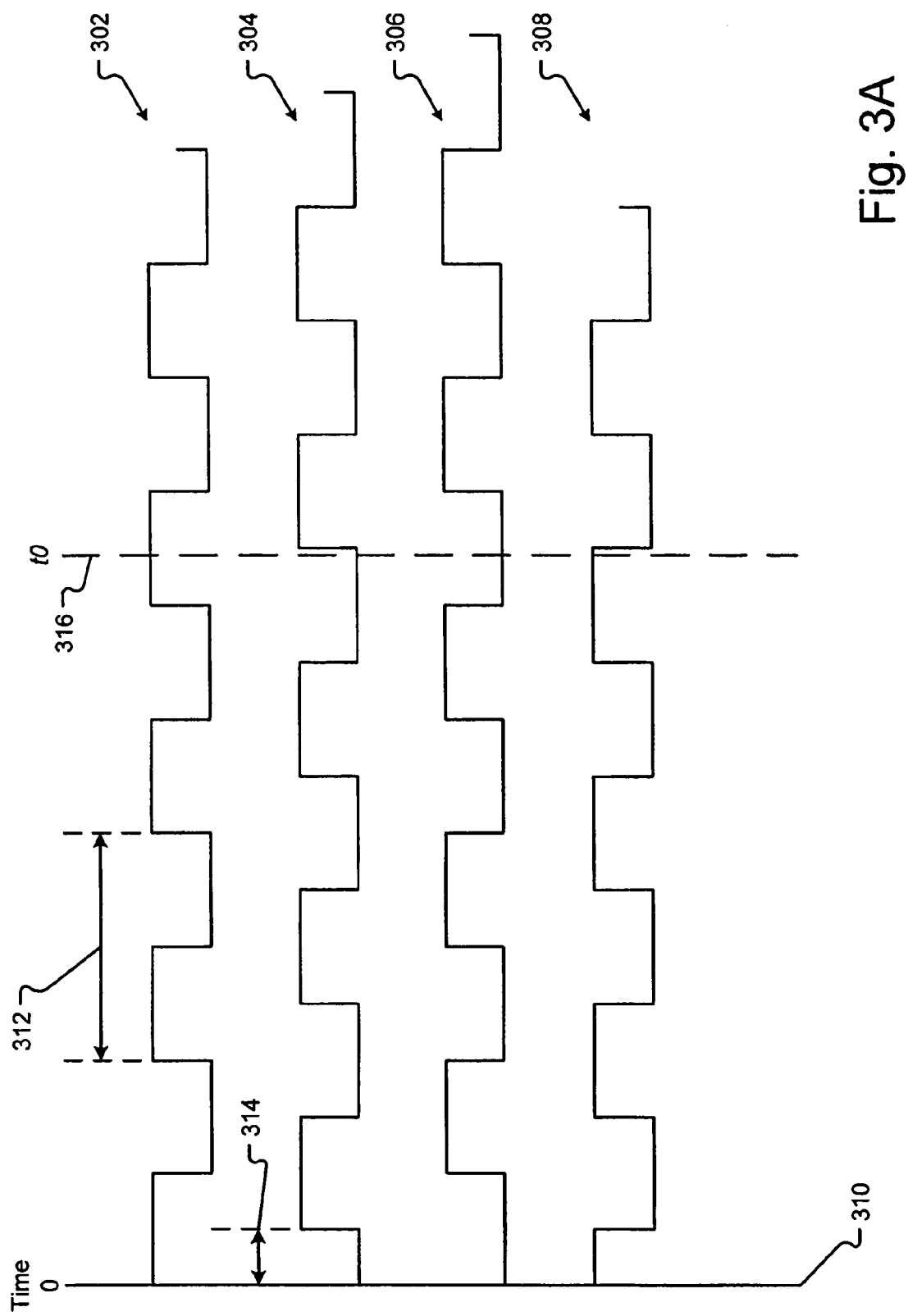

US 7,339,853 B2

TIME STAMPING EVENTS FOR FRACTIONS OF A CLOCK CYCLE

BACKGROUND

In many electronic devices, logic functions are often performed by an integrated circuit specially designed and made for the particular device. Generally there are two types of custom integrated circuits, an Application Specific Integrated Circuit (ASIC) or a Field Programmable Gate Array (FPGA). ASICs provide a generally fast processor with clock speeds that may exceed 1 GHz. Unfortunately, ASICs and the engineering effort required to design and produce the ASIC can be cost prohibitive.

Designers often use FPGAs to reduce the cost of electronic devices. However, FPGAs operate up to 500 MHz, which is much slower than ASICs and do not work well in application that require the higher clock speeds of ASICs.

SUMMARY

In general terms, this document is directed to circuits and methods for time stamping an event at a fraction of a clock cycle.

One aspect is a time stamping circuit comprising two or more detection circuits. Each detection circuit is arranged to receive an event-in signal and to generate an event signal based on a phase of a clock cycle at which the event-in signal is detected. A decoder is in electrical communication with the two or more detection circuits. The decoder outputs an event-out signal and at least one bit representing the phase of the clock cycle at which the event-in signal was detected. The one or more bits are based on the event signals received from the two or more detection circuits.

Another aspect is time stamping circuit comprising a detection circuit including two or more detection elements. Each detection element is arranged to receive an event-in signal and output an event signal based on a phase of a clock cycle at which the event-in signal is received. A decoder is in electrical communication with each detection element such that the decoder outputs an event-out signal and at least one bit representing the phase at which the event-in signal is detected. The at least one bit is based on the event signals received from the detection elements.

Yet another aspect is a method for time stamping an event signal comprising: receiving an event-in signal; detecting a phase of a clock cycle during which the event-in signal was received; and outputting an event-out signal and at least one bit representing the phase at which the event-in signal was detected.

BRIEF DESCRIPTION OF THE DRAWINGS

FIG. 3A and FIG. 3B are timing diagrams of sample waveforms related to the time stamping circuit in FIG. 2 and illustrating the time stamping of an event.

DETAILED DESCRIPTION

Figure 1:
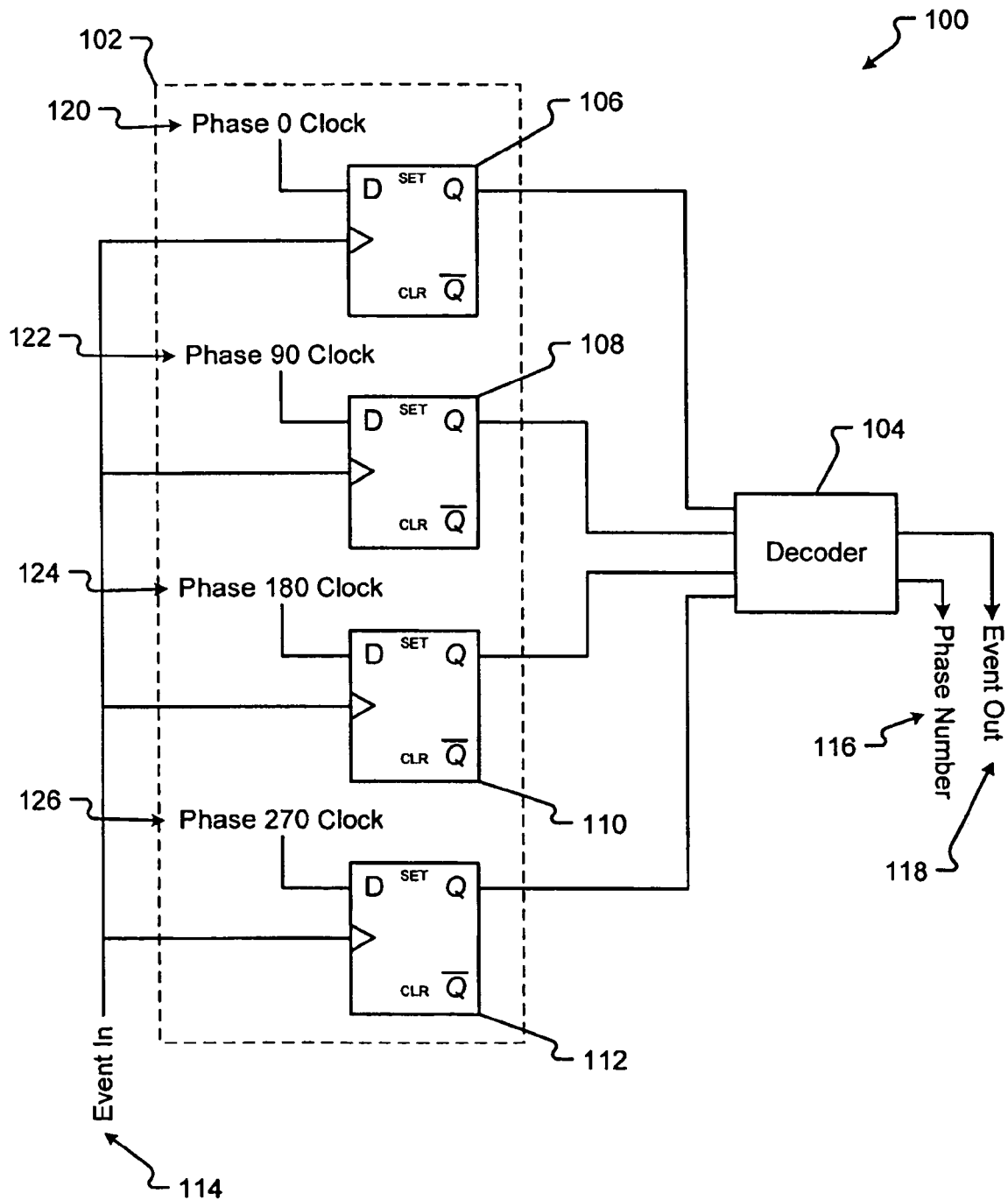
FIG. 1 is a schematic diagram of an exemplary embodiment of a digital time stamping circuit.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

In the exemplary embodiment, a time stamping circuit detects and identifies an event to a fraction of a clock cycle. The time stamping circuit detects the occurrence of an event signal at a predetermined phase of the clock, which is a fraction of the whole clock cycle. The clock cycle is divided into two or more phases, such that the time stamping circuit is provided two or more clock signals, each clock signal having a different, predetermined phase. An event can be detected using one of the several clock signals having a predetermined phase. In one embodiment, an event-in signal is sent to at least one detection circuit that may contain one or more detection elements. The detection circuit outputs an event signal based on the phase of the clock cycle at which the event-in signal was received. In the exemplary embodiment, a decoder receives the event signal from the one or more detection circuits and outputs an event-out signal and at least one bit representing the phase at which the event-in signal was detected. The one or more bits identifying the phase are based on the one or more event signals from the one or more detection circuits.

An exemplary embodiment of a time stamping circuit 100 is shown in FIG. 1. The time stamping circuit 100 comprises a detection circuit 102 and a decoder circuit 104, referred to hereinafter as a decoder. The detection circuit 102 includes two or more detection elements 106, 108, 110, and/or 112. The detection elements are flip-flops or may also be latches, other circuits, or other electronic elements capable of performing the functions of a detection element as described herein. Each detection element 106, 108, 110, and 112 receives an event-in signal 114. In the exemplary embodiment, the event-in signal 114 is an input connected to the clock pin of the flip-flop. The event-in signal 114, like the other signals described herein, is a digital signal, which has two states, a low state, represented digitally as a zero, and a high state, represented digitally as a one. The low state and high state may be any voltage as required to cause an output by the flip-flop or other type of detection element or cause some operation to be performed by a circuit or other electrical element.

Two or more clock signals with predetermined phases are input into the time stamping circuit 100. For example, current FPGAs known in the art, such as the Xilinx® Virtex™ family of FPGAs, include a clock manager circuit that can produce two or more clocks having different phases. A clock signal has a different phase if its rising edge occurs at a different time than a reference clock, such as a clock 0° signal. Each detection element 106, 108, 110, and 112 in the detection circuit 102 receives a clock of a predetermined phase, such as clock signals 120, 122, 124, and 126. For example, detection element 106 receives a phase 0° clock signal 120 while detection element 108 receives a phase 90° clock signal 122. In the exemplary embodiment, the clock signal having the predetermined phase is input into the detection element, e.g., the flip-flop, as a data input.

The phases used for the clocks can have any phase division, but, in the exemplary embodiment, will have uniform or equal divisions of the 360° phase space, for example, four equal phase divisions of 0°, 90°, 180°, and 270°. Other phase divisions are possible, for example, eight equal or uniform phase divisions of 0°, 45°, 90°, 135°, 180°, 225°, 270°, and 315°. The phase divisions are uniform because the phase divisions are equally spaced throughout the phase space of 360°, e.g. phase 45° is 45° from phase 0°, phase 90° is 45° from phase 45°, etc.

In other embodiments, the phase divisions may be non-uniform. Non-uniform phase divisions include at least a first set of phase divisions having a first amount of separation in a first part of the phase space while a second set of phase divisions has a second amount of separation in a second part of the phase space. For example, the phase division from phase 315° to phase 45° may be separated by 15°. In contrast, the phase divisions between phase 45° and phase 315° may be separated by 45°. The entire 360° phase space would have phase divisions 0°, 15°, 30°, 45°, 90°, 135°, 180°, 225°, 270°, 315°, 330°, 345°. Non-uniform phase divisions provide better granularity or accuracy for detecting events near a certain phase. Thus, the time stamping circuit with non-uniform phase divisions can detect events in cases where the event edges are closer to a particular phase (e.g., phase 0°), while in the t time stamping circuit with uniform phase divisions, the entire phase space (0°-360° deg) is covered uniformly.

Each detection element 106, 108, 110, and 112 outputs an event signal based on the phase at which the event-in signal is detected. After the rising edge of the clock of the predetermined phase, the detection element outputs the event signal. For example, after the rising edge of the phase 0° clock, detection element 106 outputs an event signal. Likewise, after the rising edge of the 270° clock, detection element 112 outputs an event signal. Each detection element 106, 108, 110, and 112 thus outputs an event signal at a different, predetermined time because each different clock input has a rising edge that occurs at a different phase. The detection circuit 102 can detect events and generate event signals at less than the full clock cycle, i.e., the detection circuit can detect the occurrence of an event at fractions of the clock cycle. It should be noted that by outputting events to phases of the clock, the delay elements output event signals at fractions of a clock cycle, i.e., the event signals do not need to be output only on the full clock cycle. Further, any signal output triggered by a clock having a certain, predetermined phase, e.g., the phase 0° clock, is in that clock's domain, e.g., the phase 0° clock domain. If a signal in one clock domain, e.g., the phase 0° clock domain, is output or triggered by a clock having a different phase, e.g., a phase 270° clock, then the event signal is placed or moved into that clock's domain, e.g., the phase 270° clock domain.

The event signals are sent to a decoder 104. In the exemplary embodiment, the decoder 104 is an electronic device that will output a certain event out 118 and at least one bit 116 representing the phase at which the event-in signal 114 was detected in response to the event signals. In the exemplary embodiment in FIG. 1, four event signals from the four detection elements 106, 108, 110, and 112 are received at the decoder 104. It is possible that the event signals are not received at the decoder 104 at the same instance in time, and the decoder 104 will determine at which phase the event-in signal 114 was detected not only by the value of the event signals (high or low) but by when the event signals are received. The decoder 104 determines from the event signals at which phase the event-in signal 114 was detected and outputs one or more bits 116 representing the phase at which the event-in signal 114 was detected. Hereinafter, the one or more bits 116 representing the phase at which the event-in signal 114 was detected output by the decoder 104 will be referred to as a time stamp. However, the exemplary embodiments presented herein are not limited to any type or format of time stamp known in the art but can be any signal that identifies at which phase the event-in signal 114 was detected.

As an example, if an event-in signal 114 has its rising edge between phase 0° and phase 90° of the clock, detection element 108 will output the first event signal to the decoder 104. At a quarter of a clock cycle later, detection element 110 will output an event signal to the decoder 104. A quarter of a clock cycle after detection element 110 outputs an event signal, detection element 112 will output an event signal to the decoder 104. The decoder will receive the first event signal from detection element 108 and two other event signals will follow from detection elements 110 and 112. It should be noted that a quarter of the clock cycle after detection element 112 outputs an event signal, detection element 106 will output an event signal because the next rising edge of the phase 0° clock will occur which will trigger the event signal for detection element 106. However, the decoder 104 can recognize that the first event signal was from detection element 108 and may ignore the later arriving event signal from detection element 106. The decoder 104 determines that the event signals received provide the code 0,1,1, and 1, i.e., no event signal was received from detection element 106 while an event signal was received from each of detection elements 108, 110, and 112. The decoder 104 then determines that the event, according to the event signals 0, 1, 1, and 1, occurred between phase 0° and phase 90° of the clock. A time stamp 116, such as the two bit code "01," representing the phase, e.g., phase 90°, at which the event-in signal 114 was detected is output from the decoder 104 with the event-out signal 118.

Figure 2:
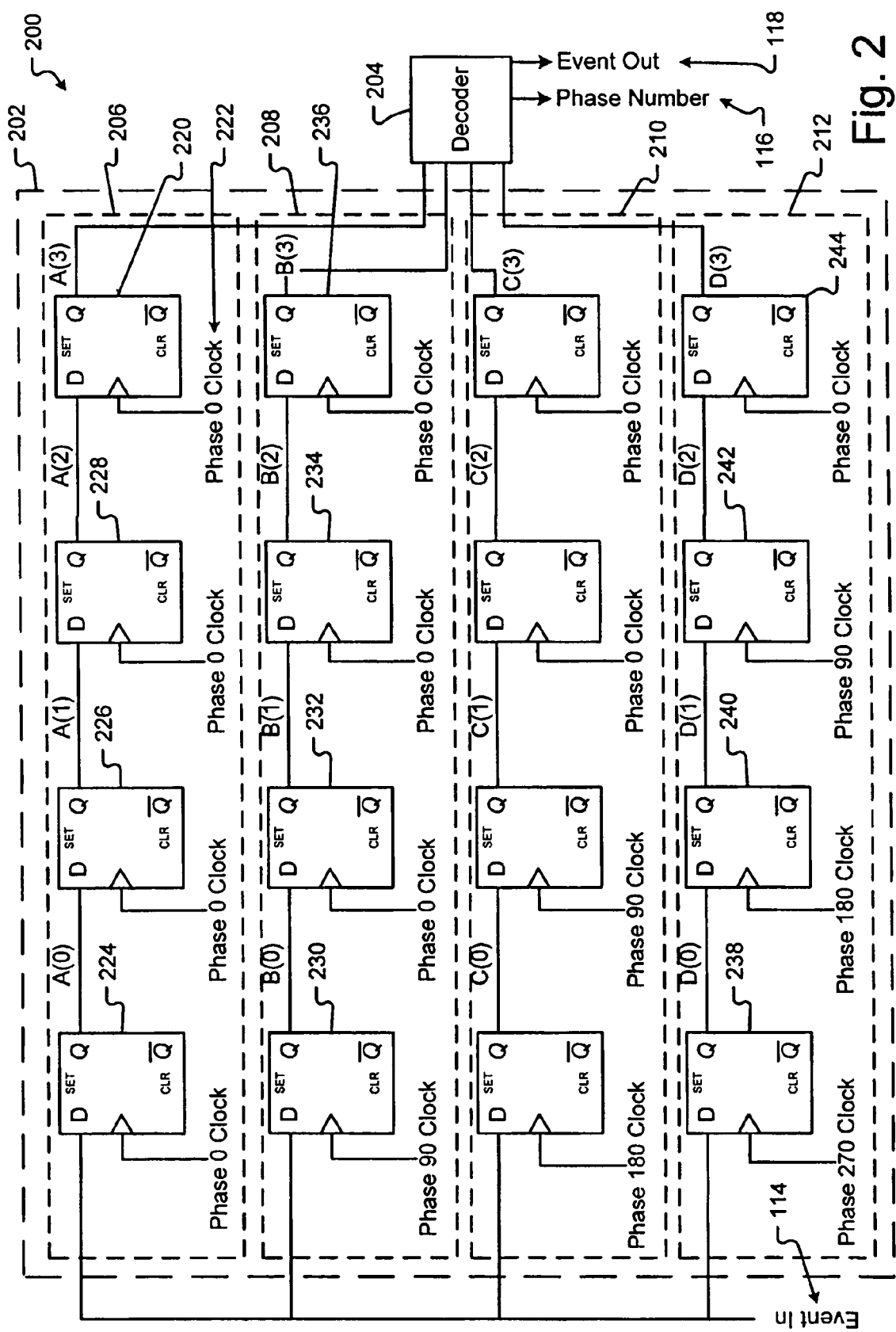
FIG. 2 is a schematic diagram of another embodiment of a digital time stamping circuit.

Another exemplary embodiment of a time stamping circuit 200 is shown in FIG. 2. The time stamping circuit 200 comprises two or more detection circuits 202 and a decoder 204. In the exemplary embodiment, the detection circuits 202 each include two or more detection elements, such as detection element 220. In the exemplary embodiment, the detection elements are flip-flops or may also be latches, other circuits, or other electronic elements capable of performing the functions of a detection element as described herein. Each detection circuit 206, 208, 210, and 212 can receive an event-in signal 114. In the exemplary embodiment, the first detection element in each detection circuit receives the event-in signal 114 and then relays an event signal to two or more other detection elements. For example, the first detection element 224 in detection circuit 206 may receive the event-in signal 114. Detection element 224 can then relay the event signal A(0) to detection element 226, which relays the event signal A(1) to detection element 228, which relays the event signal A(2) to detection element 220. Detection element 220 outputs the event signal A(3) to the decoder 204.

In the exemplary embodiment, each detection element receives a clock having a predetermined phase. The clock input into each detection element causes the detection element to detect whether the event-in signal 114 occurs at or before the predetermined phase. By changing the clock input to have a predetermined phase, the detection circuit can change when an event signal is detected at the detection circuit. For example, detection circuit 206 inputs the phase 0° clock into the first detection element 224. As such, the detection element 224 detects whether the event-in signal 114 occurs at or before the rising edge of a phase 0° clock. Similarly, a phase 90° clock is input into detection element 230 and detects if the event-in signal 114 occurs between phase 0° and phase 90°.

As an example, if the clock period or clock cycle is 4 ns, the detection circuits 202 can detect when an event-in signal 114 occurs to a 1 ns resolution. Detection circuit 206 detects if the event-in signal occurs between phase 270° and phase 0° of the clock cycle. Detection circuit 208 detects if the event-in signal occurs between phase 0° and phase 90; detection circuit 210 detects if the event-in signal occurs between phase 90° and phase 180; and detection circuit 212 detects if the event-in signal occurs between phase 180° and phase 270. The detection circuit 206 detects if the event-in signal 114 occurs at or before 0 ns or 4 ns, detection circuit 208 detects if the event-in signal 114 occurs at or before 1 ns or 5 ns, detection circuit 210 detects if the event-in signal 114 occurs at or before 2 ns or 6 ns, and detection circuit 208 detects if the event-in signal 114 occurs at or before 3 ns or 7 ns.

The other detection elements after the first detection element in each detection circuit help delay the event signals to the decoder such that each event signal from each detection circuit arrives at the decoder at the same time. The detection elements after the first detection element trigger the event signals using clocks having predetermined phases to ensure the event signal is sent to the decoder 204 in the phase 0° domain. For example, the first detection element 238 in detection circuit 212 detects if the event-in signal 114 occurs at or before phase 270° of the clock cycle. If the event-in signal 114 is detected at or before phase 270°, detection element 238 outputs the event signal D(0) to detection element 240. At the instant time when detection element 238 outputs the event signal D(0), detection element 224 would have output event signal A(0) three phases ahead of event signal D(0). For example, if the clock cycle is 4 ns, detection element 224 may output an event signal A(0) 3 ns before detection element 238 would output event signal D(0) for the same event-in signal 114. Thus, the timing of the event signal D(0) must be "moved" 3 ns to ensure the event signal from detection circuit 212 arrives at the decoder 204 at the same time as the event signal A(0) from detection circuit 206. The other detection elements 240, 242, and 244 ensure that the event signal D(0) from detection circuit 212 is shifted the 3 ns. Thus, detection element 240 outputs event signal D(1) after the rising edge of the phase 180° clock, or 3 ns after receiving event signal D(0). Likewise, detection element 242 outputs event signal D(2) 3 ns after receiving detection signal D(1) and detection element 244 outputs event signal D(3) 3 ns after receiving detection signal D(2). The total delay for the event signal D(0) to be output from detection circuit 212 is 9 ns. By triggering each flip-flop with a clock having a predetermined phase the detection circuit 212 provides a delay between the generation of a first event signal D(0) from a first detection element 238 and the generation of a second event signal D(1) from a second detection element 240. The delay between the detection elements 238 and 240 allows enough time for any setup times, hold times, and or propagation delays. All other detection circuits provide similar delays between the triggering of one detection element and another detection element. The total delay for the event signal A(0) to be output from detection circuit 206 is 12 ns. Event signals from detection circuit 206 and detection 212 are output at the same time, i.e., the 3 ns difference between the outputs of event signal A(0) and event signal D(0) added with the 9 ns of delay in the rest of detection circuit 212 equal the 12 ns of delay in detection circuit 206. The other detection circuits 208 and 210 function similarly.

The first detection element in each detection circuit receives an input clock having a different, predetermined phase. e.g., detection element 224 receives the phase 0° clock and detection element 238 receives the phase 270° clock. The event-in signal 114, when detected by the first detection element, is detected in the clock domain of the input clock. For example, when the event-in signal 114 is detected by detection element 224, the event-in signal is detected in the phase 0° clock domain; the event-in signal 114 is detected in the phase 270° clock domain by detection element 238. Each detection circuit 206, 208, 210, and 212 detects the event-in signal 114 in a different clock domain. However, each detection circuit 206, 208, 210, and 212 moves or shifts the clock domain for the event signal, such that the detection elements 206, 208, 210, and 212 outputs the event signal to the decoder 204 in a common clock domain. For example, detection circuit 206 moves the event signal A(0) generated in the phase 0° clock domain to the common phase 0° clock domain that is used for inputs into the decoder 204. Detection circuit 212 moves the event signal D(0) generated in the phase 270° clock domain to the common phase 0° clock domain.

The detection circuits 202 provide a means for detecting an event-in signal to fractions of the clock cycle. By delaying when the event signal will be output, each of the detection circuits either simultaneously or near simultaneously provide, to the-decoder 204, the event signal representing at what predetermined phase of the clock cycle an event-in signal 114 occurred. Decoder 204 functions similarly to decoder 104 but may forego the determination of the time at which the event signals arrive because the event signals from detection circuits 202 arrive at or near the same time. An exemplary embodiment of a logic table for the decoder is shown below

| Inputs to Decoder | Values of Inputs | | | |
|---|---|---|---|---|
| A(3) | 1 | 0 | 0 | 0 |
| B(3) | 1 | 1 | 0 | 0 |
| C(3) | 1 | 1 | 1 | 0 |
| D(3) | 1 | 1 | 1 | 1 |
| Phase Detected | 0 | 90 | 180 | 270 |
| 2 Bit Time Stamp | 00 | 01 | 10 | 11 |

Further, by using several detection elements in the detection circuits 202, the time stamping circuit 200 provides for metastability, as understood in the art. Metastability occurs when an input into a flip-flop is between the threshold voltages for the high state and the low state of the flip-flop when the flip-flop is clocked. As a simple example, for TTL logic, a logic low occurs between 0 to 0.8 volts and a logic high occurs between 2.4 to 5 volts. Metastability may occur if the input voltage is between 0.8 volts and 2.4 volts. A metastable flip-flop may output a runt pulse or oscillate; in either case, the circuit may fail.

Metastability often occurs due to set-up or hold time violations. A set-up time violation occurs if an input into the flip-flop does not have enough time to reach a threshold voltage before the flip-flop receives an incoming clock edge. Hold time violations occur if the input signal does not remain above or below a threshold voltage for the time it takes the clock edge to transition. Generally, metastability can occur when an asynchronous signal, i.e., a signal not triggered in the same clock domain as the flip-flop, is input into the flip-flop. The asynchronous signal may transition during the reception of the clock edge, and the flip-flop will receive a voltage that is neither at the high state or the low state.

The time stamping circuit 200 can time stamp asynchronous signals. To mitigate or alleviate the possibility of metastability, each detection circuit contains two or more flip-flops. The several flip-flops in the detection circuit increase the probability that an input signal will be evaluated and the output from the series of flip-flops will become stable.

Figure 3B:
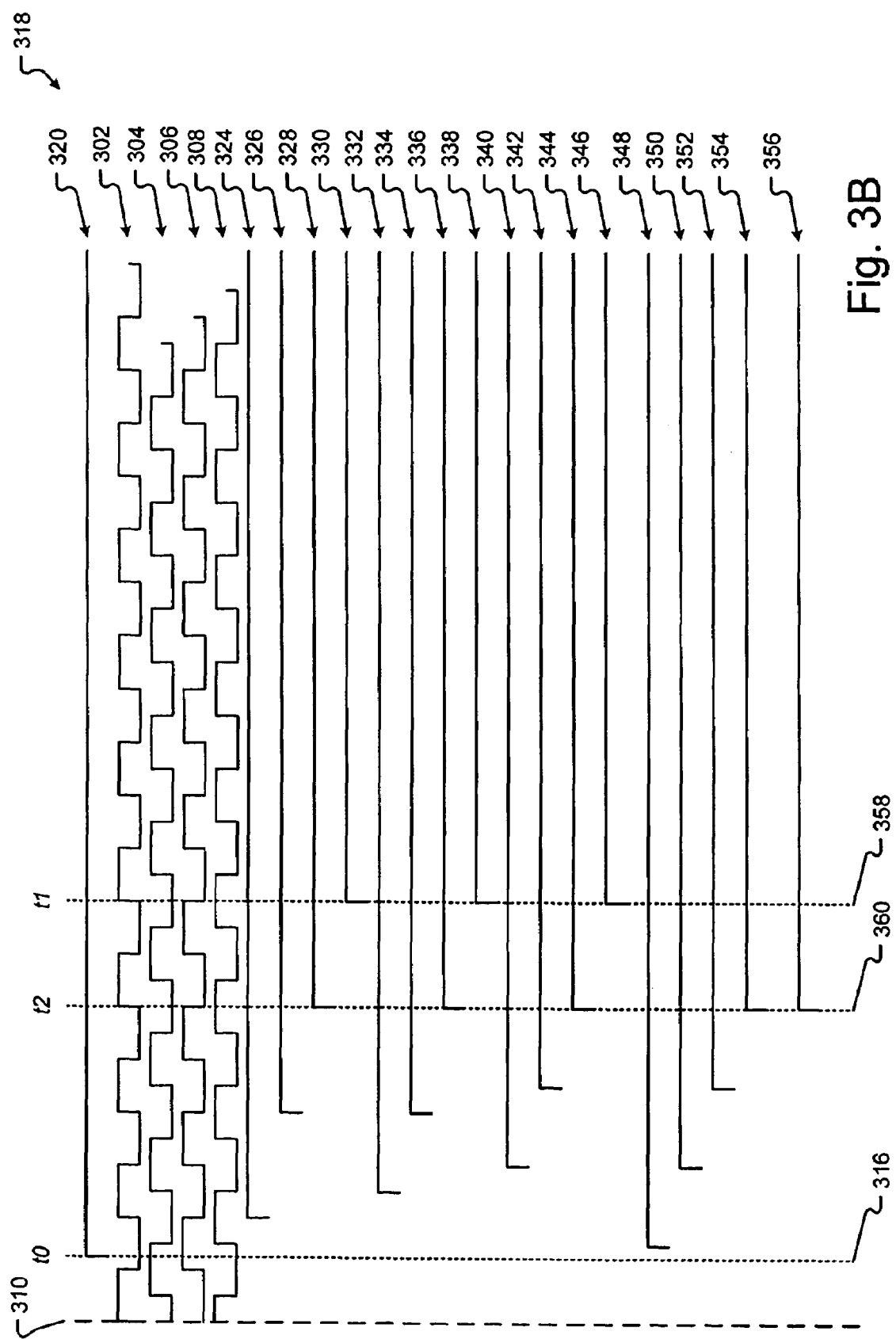

FIG. 3A and FIG. 3B illustrate timing diagrams 300 and 318 representative of time stamping circuit 200 shown in FIG. 2. Time stamping circuit 200 (FIG. 2) has four clock inputs. The phase 0° clock input is shown as clock signal 302, the phase 90° clock input is shown as clock signal 304, the phase 180° clock input is shown as clock signal 306, and the phase 270° clock input is shown as clock signal 308. Each clock has the same period represented by the distance 312. The clock period is the amount of time required for the clock to complete a clock cycle, e.g., 4 nanoseconds. A clock cycle cycles through 360°. In other words, a clock may start at 0° and cycle back to its starting position in 360°. However, in timing diagrams, the clock cycle is represented by a waveform such that the clock signal starts at a certain vertical position at 0° and cycles back to the vertical position in 360°. The clock cycle is important to understanding phases.

Each clock 302, 304, 306, and 308 has a different phase. For example, the phase 0° clock has its rising edge at time 0, represented by line 310; the phase 90° clock has its rising edge one quarter of the clock cycle after the phase 0° clock, as represented by the distance 314. The phase 90° clock starts at phase 90°, which is one quarter of a 360° clock cycle. As is shown by timing diagram 300, the phase 180° clock has its rising edge one half of a 360° clock cycle, or 180°, after the phase 0° clock's rising edge, and the phase 270° clock has its rising edge three quarters of a 360° clock cycle, or 270°, after the phase 0° clock's rising edge. If the clock cycle or period is 4 ns, the phase 0° clock would have its rising edge at time 0 and every 4 ns thereafter, the phase 90° clock would have its rising edge at time 1 ns and every 4 ns thereafter, the phase 180° clock would have its rising edge at time 2 ns and every 4 ns thereafter, and the phase 270° clock would have its rising edge at time 3 ns and every 4 ns thereafter. Using the clocks having different phases, the time stamping circuit 200 can detect events at less than the full clock cycle, e.g., time stamping circuits using clocks having four different phases and using a clock cycle of 4 ns can detect events at a 1 ns resolution. As such, the exemplary time stamping circuit functionally operates four times faster than the clock cycle. For example, the time stamping circuit can detect an event, represented by line 316, at approximately time t0. Rather than wait for the next rising edge of the phase 0° clock 302 (3 ns after the desired detection time t0), the time stamping circuit outputs an event signal after the rising edge of the phase 90° clock 304.

The timing diagram 318, in FIG. 3B, further illustrates how a time stamping circuit, such as time stamping circuit 200 (FIG. 2), can detect an event at time t0. In the example shown in FIG. 3B, an event is to be detected at or near time t0 represented by line 316. As explained with FIG. 2, an event-in signal 320, such as event-in signal 114 (FIG. 2), is received at two or more detection circuits, such as detection circuits 202 (FIG. 2). The event-in signal 320 is received at time t0 represented by line 316. The four clocks 302, 304, 306, and 308, each having a predetermined phase, are input into one or more detection elements in the detection circuits. A first set of signals 324 through 330 shows the processing in the first detection circuit 206. After the rising edge of the phase 0° clock input 302 into detection element 224, an event signal 324, such as event signal A(0) (FIG. 2), is output from the detection element 224. At the next rising edge of the phase 0° clock 302, event signal 326, such as event signal A(1) (FIG. 2), is output from detection element 226. Event signal 326, such as event signal A(2) (FIG. 2), is output from detection element 228 at the next rising edge of the phase 0° clock 302, and event signal 328, such as event signal A(3) (FIG. 2), is output from detection element 220 at the next rising edge of the phase 0° clock 302.

The other detection circuits 208, 210, and 212 (FIG. 2) operate similarly. After the rising edge of the phase 90° clock input 304 into detection element 230 of detection circuit 208, an event signal 332, such as event signal B(0) (FIG. 2), is output from the detection element 230. At the next rising edge of the phase 0° clock 302, event signal 334, such as event signal B(1) (FIG. 2), is output from detection element 232. Event signal 336, such as event signal B(2) (FIG. 2), is output from detection element 234 at the next rising edge of the phase 0° clock 302 and event signal 338, such as event signal B(3) (FIG. 2), is output from detection element 236 at the next rising edge of the phase 0° clock 302. For detection circuit 210, event signal 340, such as event signal C(0) (FIG. 2), is output at the next rising edge of the phase 180° clock 306. Event signal 342, such as event signal C(1) (FIG. 2), is output at the next rising edge of the phase 90° clock 304; event signal 344, such as event signal C(2) (FIG. 2), is output at the next rising edge of the phase 0° clock 302; and event signal 346, such as event signal C(3) (FIG. 2), is output at the next rising edge of the phase 0° clock 302. It should be noted that event signals 330, 338, and 346 are output from detection circuits 206, 208, and 210 at the same time t1 represented by line 358.

While detection circuit 212 operates similarly, the output from detection circuit 212 occurs at a different time. For example, after the rising edge of the phase 270° clock input 308 into detection element 238, an event signal 348, such as event signal D(0) (FIG. 2), is output from the detection element 238. At the next rising edge of the phase 180° clock 306, event signal 350, such as event signal D(1) (FIG. 2), is output from detection element 240. Likewise, event signal 352, such as event signal D(2) (FIG. 2), is output from detection element 242 at the next rising edge of the phase 90° clock 304 and event signal 354, such as event signal D(3) (FIG. 2), is output from detection element 244 at the next rising edge of the phase 0° clock 302. If an event occurs at time t0 316, then detection circuit 212 will output an event signal 354 (signal D(3) in FIG. 2) at a time t2 represented by line 360, which is a full clock cycle ahead of the other event signals that output at time t1. In the exemplary embodiment, the decoder, such as decoder 204, awaits the first set of event signals and determines the phase at which the event signal is detected by both the value of the event signals and the time at which the event signals arrived at the decoder. The decoder receives, in the exemplary embodiment provided in FIG. 3, event signals having the following values A(3)=0, B(3)=0, C(3)=0, and D(3)=1. As explained in conjunction with FIG. 2, the decoder determines that the event occurred at or before phase 270° (between phase 180° and phase 270°). The decoder then outputs the event signal 356 with a time stamp, e.g., "11," representing that the event occurred at phase 270°.

Referring again to FIG. 2, the exemplary time stamping circuit 200 includes four detection circuits 202. A time stamping circuit may have more or fewer detection circuits. In the exemplary embodiment, the detection circuits and the detection elements in the detection circuits may form an array of the size N by M. N equals the number of detection circuits in the time stamping circuit. M equals the number of detection elements in one or more detection circuits. The number of detection circuits N, in the exemplary embodiment, equals the number of phase divisions available for the clock. For example, if the clock has four phase divisions, e.g., phase 0° clock signal, phase 90° clock signal, phase 180° clock signal, etc., then the time stamping circuit has four detection circuits, but, if the clock has sixteen phase divisions, e.g., phase 22.5 clock signal, phase 45 clock signal, phase 67.5 clock signal, etc., then the time stamping circuit has sixteen detection circuits. While the number of detection circuits may equal the number of phase divisions for the clock, the number of detection elements M does not need to equal the number of phase divisions.

Figure 4:
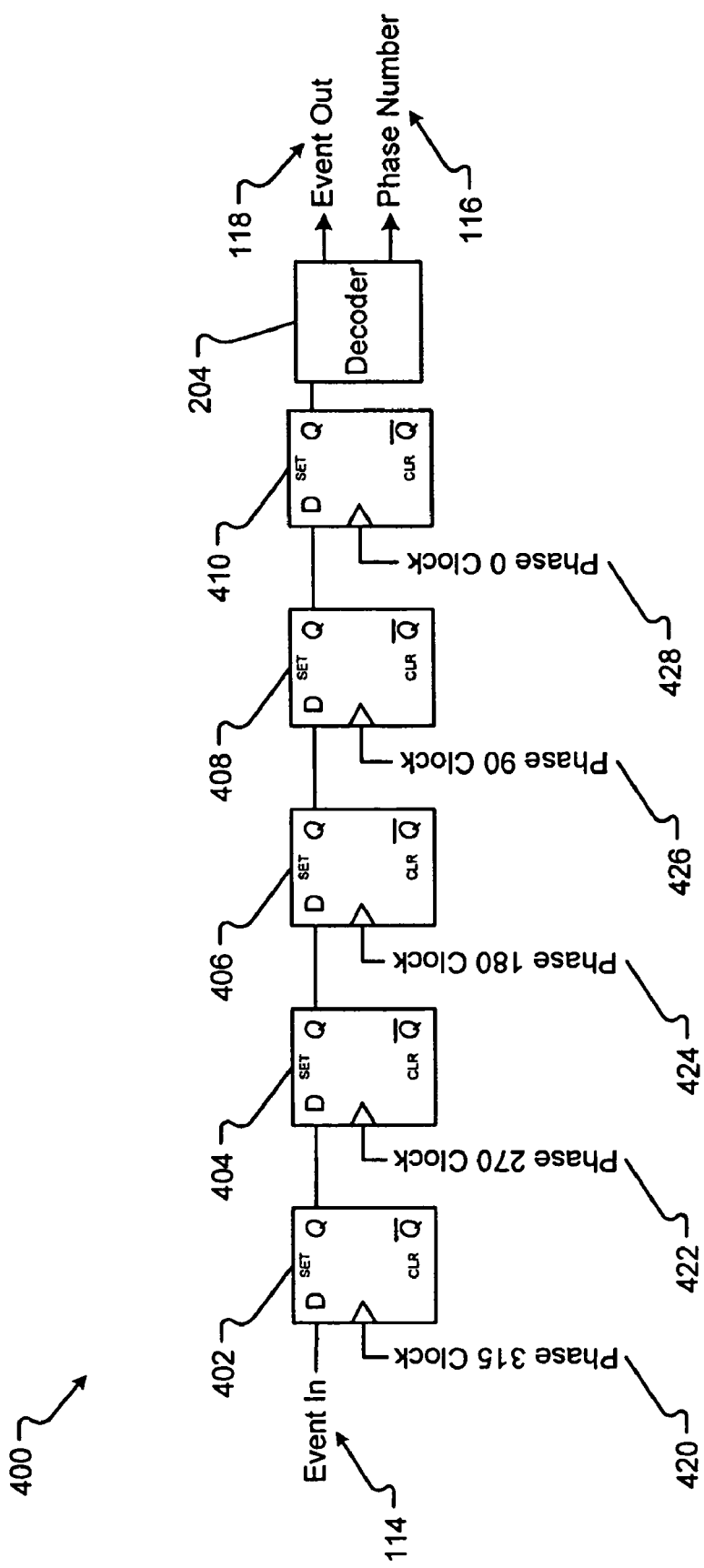
FIG. 4 is a schematic diagram of an exemplary embodiment of a detection circuit.

An exemplary detection circuit 400 for a time stamping circuit using a clock with eight phase divisions is shown in FIG. 4. In the exemplary embodiment, detection circuit 400 can detect an event at phase 315° of the clock. There are only five detection elements, 402, 404, 406, 408, and 410 in detection circuit 400. The event signal 114 is input into the detection circuit 400. The first detection element 402 operates similarly to detection elements 224, 230, and 238 for detection circuits 206, 208, and 212 in FIG. 2. Detection element 402, in contrast, detects an event-in signal that occurs at or before phase 3150 because the phase 315° clock 420 is input into detection element 402. Detection element 402 outputs the event signal at or before the rising edge of the phase 315° clock. If the clock has a period of 4 ns, an event signal occurring before phase 0° would be detected at detection element 402 3.5 ns after the event signal is detected at the detection element receiving the phase 0° clock. The detection circuit 400 is also configured to output an event signal sometime later in the phase 0° clock domain. Detection elements 404, 406, 408, and 410 output the event signals at fractions of the clock cycle to ensure the event signal arrives at the decoder 204 at the same time as the other event signals, e.g., A(3), B(3), etc., and in the phase 0° clock domain. Detection circuit 400 includes 5 detection elements, but, in other exemplary embodiments, the detection circuits may have more or fewer detection elements in a time stamping circuit that uses a clock with eight phase divisions. All the signals from the detection circuits should arrive at the decoder at the same time and in the same clock domain, whether the clock domain is the phase 0° clock domain or another clock domain.

Referring to time stamping circuit 100 in FIG. 1, the time stamping circuit 100 can also be configured to detect an event signal at any phase division of the clock signal. For example, to detect an event signal at any of eight phase divisions, the detection circuit 102 would require eight detection elements, similar to detection elements 106 or 108. Each detection element would receive a clock having a predetermined phase equal to one of the eight phase divisions. In addition, the decoder 104 would be configured to determine the phase from the eight event signals being input into the decoder 104.

Figure 5A:
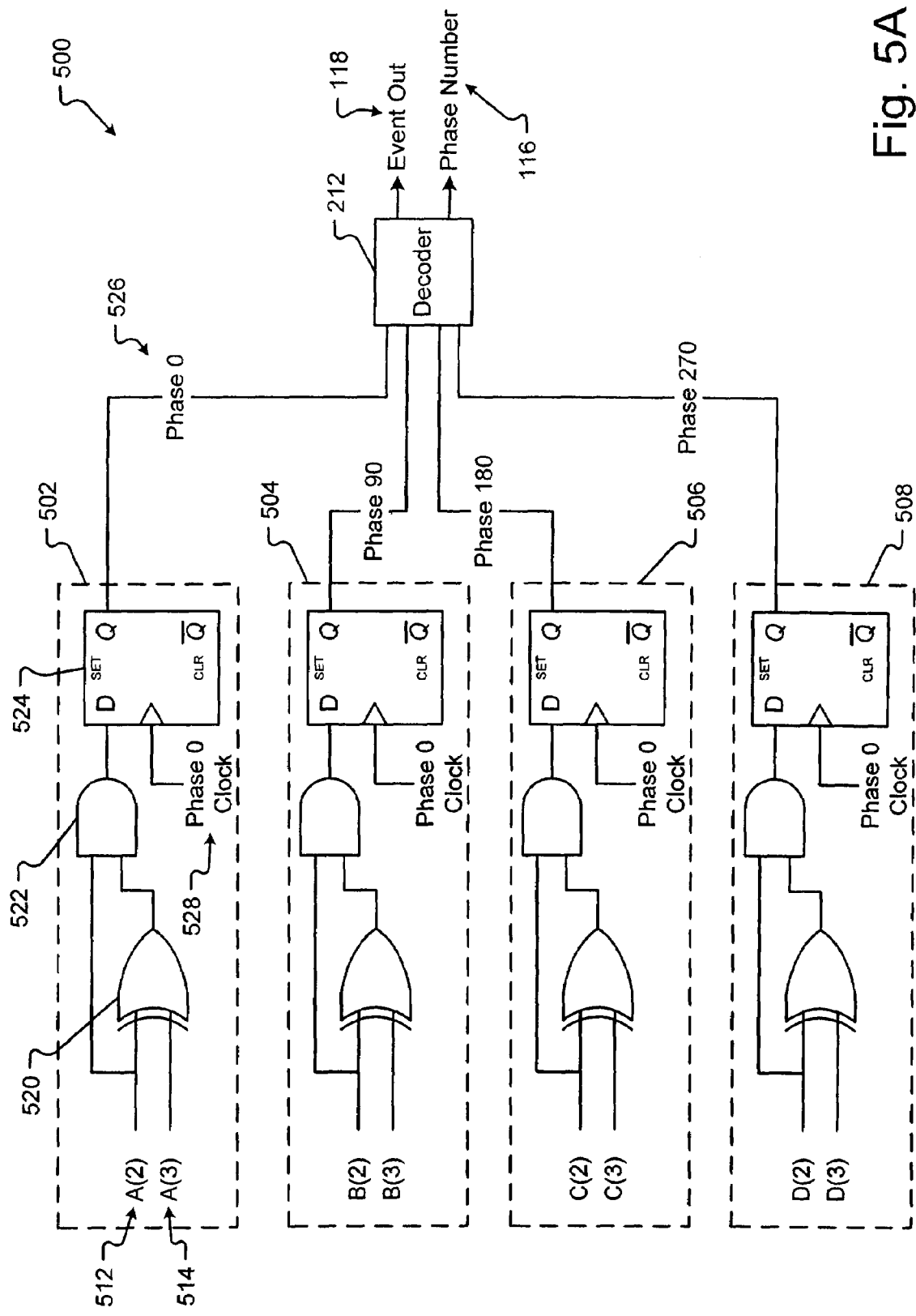
FIG. 5A is a schematic diagram of an exemplary embodiment of an input circuit.

In a further embodiment, a circuit 500 includes one or more input circuits 502, 504, 506, and 508, receives inputs from the detection circuits, and outputs event signals for only one clock cycle. Each input circuit operates similarly and receives similar inputs from the detection circuits to which the input circuits are electrically connected. Thus, only one input circuit 502 will be explained. The input circuit 502 includes an exclusive OR (XOR) gate 520, an AND gate 522, and a flip-flop 524 electrically connected as shown in FIG. 5. The XOR gate 520 receives the A(2) input 512 (see FIG. 2) and the A(3) input 514 (see FIG. 2). Only when one of the A(2) input 512 or A(3) input 514 are at a high state does the XOR gate 520 output a high signal to the AND gate 522. The AND gate 522 receives the A(2) input 512 and the output from the XOR gate 520. When both the A(2) input 512 and the XOR gate output are at a high state, the AND gate 522 outputs a signal to the flip-flop 524. After the output of the AND gate 522 goes high, the flip flop 524 outputs the Phase 0° event signal 526 when the rising edge of the phase 0° clock input 528 occurs. When the output from the AND gate 522 stops, the output from the flip-flop 524 will stop at the next rising edge of the phase 0° clock. The output from any input circuit may only last one clock cycle. In other exemplary embodiments, other circuits or electrical elements may be used in circuit 500 and any electrical element or configuration of electrical elements may be used that is operable to perform the functions described herein.

Figure 5B:
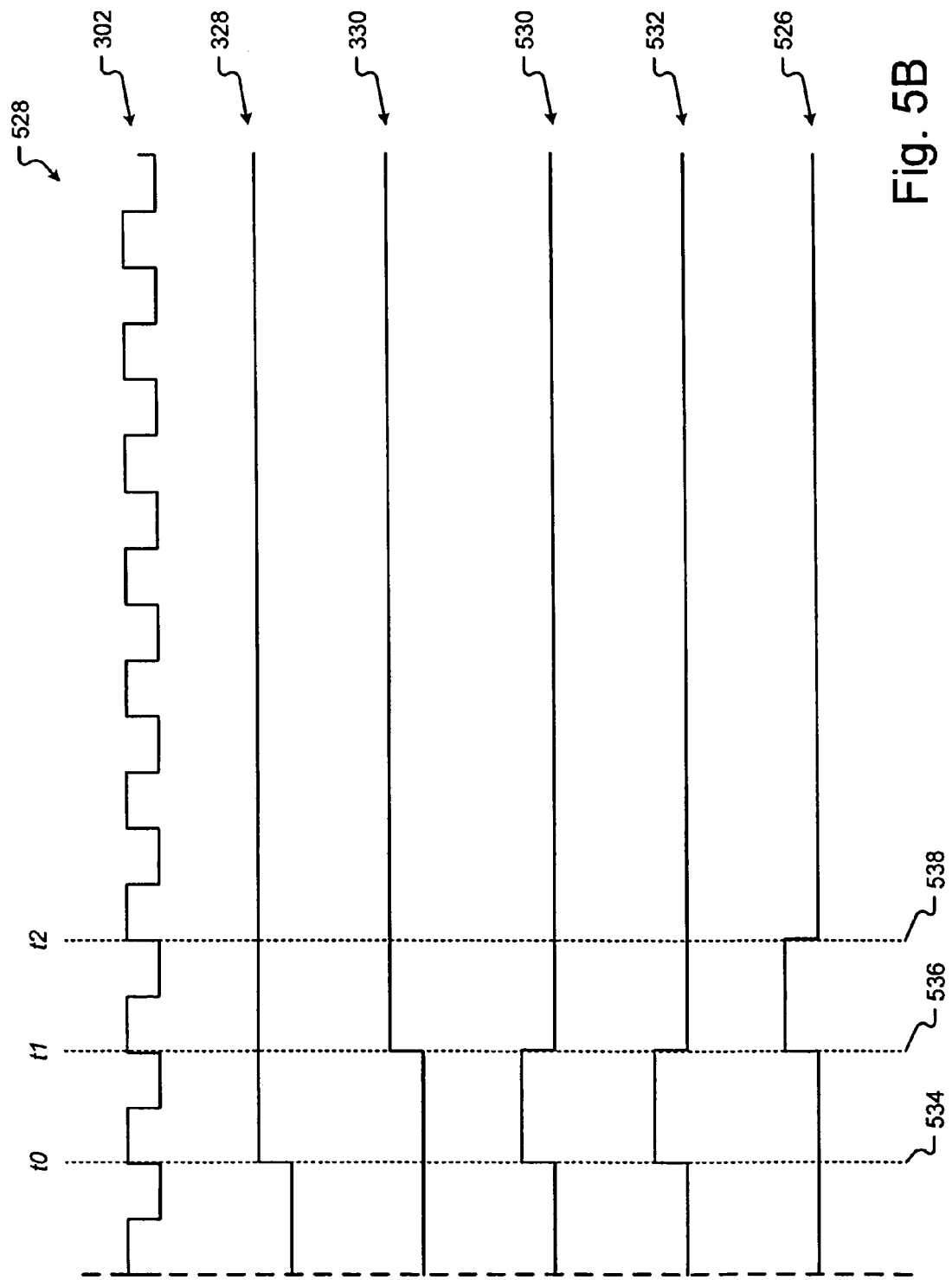
FIG. 5B is a timing diagram of sample waveforms related to the input circuit in FIG. 5A and illustrating a one clock cycle event signal.

To better explain the function of input circuit 502, an exemplary timing diagram 528 is shown in FIG. 5B. Here, the phase 0° clock 302 is shown which is the input into the detection elements 228 and 220 (FIG. 2). The A(2) input 328, such as input 512 (FIG. 5A), goes high at time t0 while the A(3) input 330, such as input 514, remains low. The output 530 from the XOR gate 520 goes high at approximately the same time t0 because at time t0 only A(2) 328 is high while A(3) is low. The output from the AND gate 522 also goes high at approximately time t0 because both the output from the XOR gate 530 is high and input A(2) 328 are high. The output from the AND gate 522 is sent to the flip-flop 524, which also receives the phase 0° clock 302. At the clock cycle that begins at time t1 represented by line 536, the phase 0° output 526 goes high. Meanwhile, the A(3) input 514 goes high, which causes the output from the XOR gate 530 and the output 532 from the AND gate 522 to go low. However, the output from the flip flop 524 is latched and remains high until the next clock cycle, which begins at time t2 represented by line 538. At time t2, the flip flop is again enabled, which allows the output of the flip flop 526 to follow the input 532 from the AND gate 522. The input circuits 502, 504, 506, and 508 provide a circuit that ensures the event signals sent to the decoder last for only one clock cycle.

Figure 6:
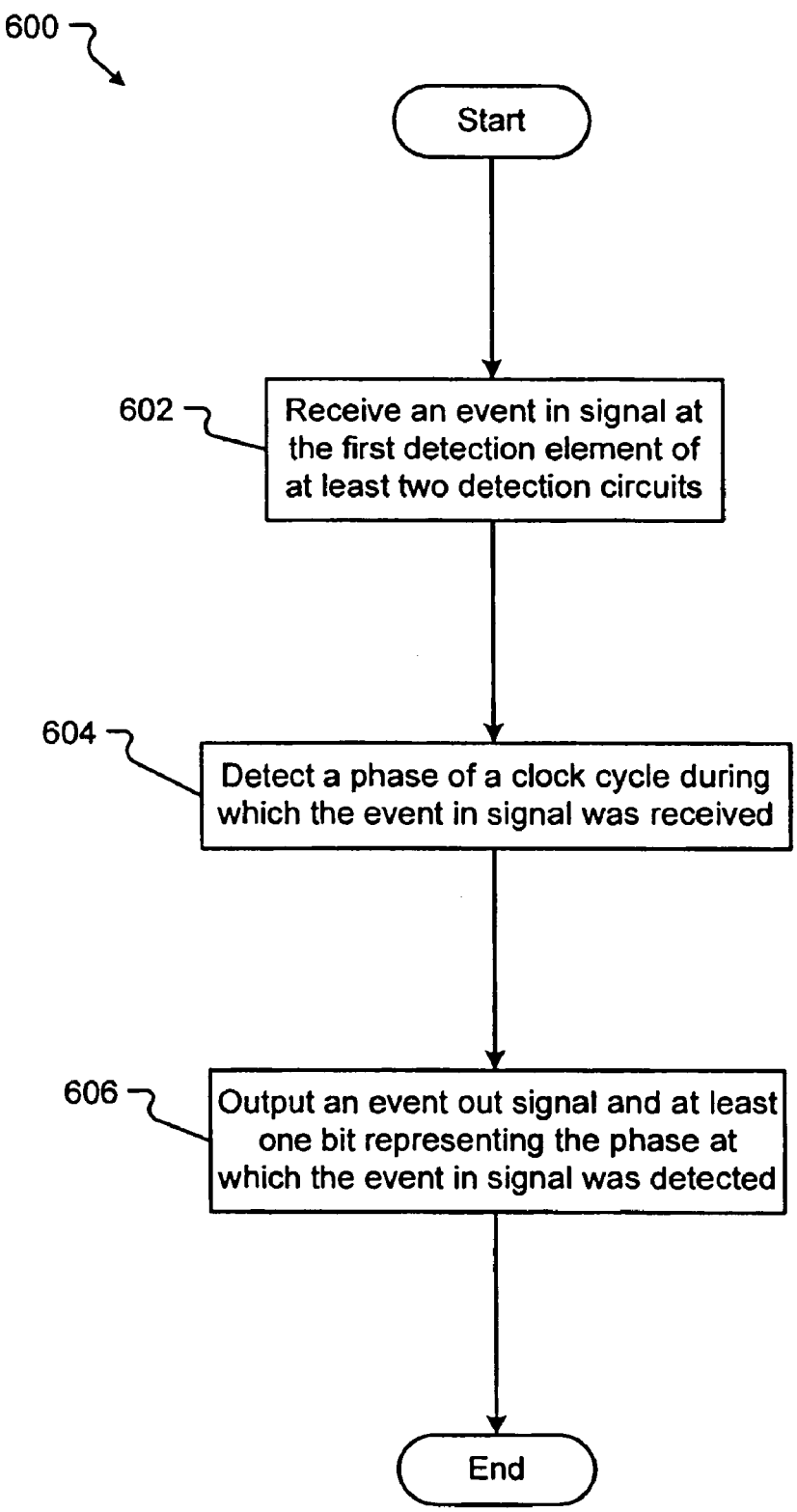
FIG. 6 shows an exemplary embodiment of a method for time stamping an event.

An exemplary method 600 for detecting the phase at which an event signal occurs, such as event signal 114 (FIG. 2), is shown in FIG. 6. Receive operation 602 receives an event-in signal, such as event-in signal 114 (FIG. 2). In one exemplary embodiment, the event-in signal is received at two or more detection circuits, such as detection circuits 202 (FIG. 2). In further exemplary embodiments, the event-in signal is received at the first detection element, such as detection element 224, of the two or more detection circuits. The detection circuits may also include one or more other detection elements, such as detection elements 226, 228, and 220 (FIG. 2), in electrical communication with the first detection element or other detection elements.

Detect operation 604 detects a phase of a clock cycle during which the event-in signal was received. In the exemplary embodiment, the event-in signal is received at the first detection element, such as detection element 238 (FIG. 2), of two or more detection circuits, such as detection circuit 212 (FIG. 2). In further exemplary embodiments, the detection elements receive a clock having a predetermined phase, such as phase 270° clock 308 (FIG. 3), and generates an event signal, such as event signal D(0) (FIG. 2), if the event-in signal is detected at or before the predetermined phase of the clock.

In further exemplary embodiments, detect operation 604 also includes sending the event signal to one or more other detection elements, such as detection elements 240, 242, and 244 (FIG. 2), such that the elapsed time between receiving the event-in signal and providing the event signal, such as event signal D(3) (FIG. 2), differs for the one or more detection circuits. In other words, the detection elements, after the first detection element, ensure that the event signal sent from the detection circuit and sent to the decoder, such as decoder 204, is in the same clock domain, e.g., phase 0° clock domain, and arrives at the decoder at approximately the same time as the other event signals sent from the other detection circuits.

Output operation 606 outputs an event-out signal, such as event-out signal 118 (FIG. 2), and at least one bit, such as time stamp 116 (FIG. 2), representing the phase at which the event-in signal was detected. In the exemplary embodiment, the event-out signal and the time stamp are output by a decoder. The decoder receives one or more event signals from one or more detection circuits. The decoder identifies the phase at which the event-in signal is detected based on the event signals, as explained in conjunction with FIG. 2. Finally, the decoder generates the time stamp representing the determined phase.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A time stamping circuit, comprising:
   two or more detection circuits arranged to receive an event-in signal and to generate an event signal based on a phase of a clock cycle at which the event-in signal is detected; and
   a decoder in electrical communication with the two or more detection circuits, the decoder outputs an event-out signal and at least one bit representing the phase of the clock cycle at which the event-in signal was detected, wherein the at least one bit is based on the event signals received from the two or more detection circuits.

2. A time stamping circuit as defined in claim 1, where in the two or more of detection circuits comprise a one or more of detection elements.

3. A time stamping circuit as defined in claim 2, wherein at least one detection element is one of a flip-flop or a latch.

4. A time stamping circuit as defined in claim 2, wherein at least one detection element in the detection circuit receives a clock having a predetermined phase and generates the event signal if the event-in signal is detected at the predetermined phase of the clock.

5. A time stamping circuit as defined in claim 4, wherein one or more other detection elements are arranged such that an elapsed time between receiving the event-in signal and providing the event signal to the decoder is different for each detection circuit.

6. A time stamping circuit as defined in claim 5, wherein at least one detection element outputs the event signal at a predetermined phase such that the event signal is output at a fraction of a full clock cycle.

7. A time stamping circuit as defined in claim 2, wherein at least one detection element outputs the event signal such that the event signal moves from one clock domain to another clock domain.

8. A time stamping circuit as defined in claim 2, wherein at least one detection circuit, comprising two or more detection elements, moves the event signal from a first clock domain in which the event-in signal was detected to a second clock domain in which the event signal is sent to the decoder.

9. A time stamping circuit as defined in claim 8, wherein there is a delay between generation of a first event signal from a first detection element and the generation of a second event signal from a second detection element.

10. A time stamping circuit as defined in claim 9, wherein the delay allows for at least one of set-up times, hold-times, or propagation delays.

11. A time stamping circuit as defined in claim 1, wherein the two or more of detection circuits forms an array of the size N by M, wherein N is a number of detection circuits and M is a number of detection elements in each detection circuit.

12. A time stamping circuit as defined in claim 11, wherein the number of detection circuits N equals a number of phase divisions available for the clock cycle.

13. A time stamping circuit as defined in claim 1, further comprising:
   two or more input circuits that receive first and second inputs from one of the detection circuits and outputs a single cycle event signal based on the first and second inputs, wherein the single cycle event signal being output at a predetermined time; and
   wherein the decoder identifies the phase in which the event-in signal was detected based on the single cycle event signals received from the two or more input circuits.

14. A time stamping circuit as defined in claim 13, wherein the decoder outputs at least one bit representing the identified phase at which the event-in signal was detected.

15. A time stamping circuit, comprising:
   a detection circuit including two or more detection elements, each detection element arranged to receive an event-in signal and output an event signal based on a phase of a clock cycle at which the event-in signal is received; and
   a decoder in electrical communication with each detection element, the decoder outputs an event-out signal and at least one bit representing the phase at which the event-in signal is detected, wherein the one bit is based on the event signals received from the detection elements.

16. A time stamping circuit as defined in claim 15, wherein at least one detection element is one of a flip-flop or a latch.

17. A time stamping circuit as defined in claim 15, wherein at least one detection element in the detection circuit receives a clock having a predetermined phase and outputs the event signal if the event-in signal is detected at the predetermined phase of the clock.

18. A time stamping circuit as defined in claim 17, wherein the detection element receives the clock as a data input.

19. A time stamping circuit as defined in claim 15, wherein the number of detection elements equals a number of phase divisions available for the clock cycle.

20. A time stamping circuit as defined in claim 15, wherein the decoder identifies the phase when the event signal was received based on the event signals received from the two or more detection elements, wherein the decoder identifies the phase asa predetermined time.

21. A time stamping circuit as defined in claim 20, wherein the decoder outputs at least two bits representing the determined phase at which the event signal was detected.

22. A method for time stamping an event signal, comprising:

receiving an event-in signal;

detecting a phase of a clock cycle during which the event-in signal was received; and outputting an event-out signal and at least one bit representing the phase at which the event-in signal was detected.

23. A method for time stamping as defined in claim 22, wherein detecting comprises:

receiving the event-in signal and a clock having a predetermined phase at one or more detection elements; and generating an event signal at one or more detection elements if the event-in signal is detected at the predetermined phase of the clock.

24. A method for time stamping as defined in claim 23, wherein detecting further comprises:

sending the event signal to one or more other detection elements in one or more detection circuits such that an elapsed time between receiving the event-in signal and providing the event signal to a decoder differs between the one or more detection circuits.

25. A method for time stamping as defined in claim 22, wherein outputting comprises:

receiving one or more event signals from one or more detection elements;

identifying a phase at which the event-in signal is detected based on the event signals; and generating at least one bit representing the determined phase.

* * * * *